United States Patent [19]

Nakamura et al.

[11] Patent Number: 5,375,997
[45] Date of Patent: Dec. 27, 1994

[54] COMBUSTION APPARATUS HAVING HEAT-RECIRCULATING FUNCTION

[75] Inventors: Sunao Nakamura; Tsuneo Matsudaira, both of Kawasaki, Japan; Felix J. Weinberg, London, England

[73] Assignee: NKK Corporation, Tokyo, Japan

[21] Appl. No.: 70,568

[22] Filed: Jun. 1, 1993

[30] Foreign Application Priority Data

Dec. 9, 1992 [JP] Japan ................. 4-351523

[51] Int. Cl.$^5$ ................. F23L 7/00
[52] U.S. Cl. ................. 431/115; 431/215; 431/328; 126/39 J; 126/92 R
[58] Field of Search ............ 431/326, 327, 328, 329, 431/115, 116, 215, 207; 126/39 J, 39 R, 92 R, 92 AC, 92 A

[56] References Cited

U.S. PATENT DOCUMENTS

| | | | |
|---|---|---|---|
| 2,921,176 | 1/1960 | Scofield | 431/328 |
| 3,270,798 | 9/1966 | Ruff | 431/329 |
| 3,299,938 | 1/1967 | Bally et al. | 126/92 R |
| 3,312,268 | 4/1967 | Milligan . | |
| 4,189,294 | 2/1980 | Rice | 126/39 J |
| 4,850,862 | 7/1989 | Bjerklie . | |
| 5,251,609 | 10/1993 | Thibault et al. | 126/39 J |

FOREIGN PATENT DOCUMENTS

| | | |
|---|---|---|
| 15668/70 | 12/1971 | Australia . |
| 157432 | 10/1985 | European Pat. Off. . |
| WO91/08432 | 6/1991 | WIPO . |

*Primary Examiner*—James C. Yeung
*Attorney, Agent, or Firm*—Frishauf, Holtz, Goodman & Woodward

[57] ABSTRACT

The combustion apparatus is composed of: a porous burner component being made of a permeable metallic material and having a centrally located first region (11a, 11aa, 11ba, 11ca) where the fuel-air mixture is ejected and the red heat condition is formed on the surface of downstream side and having a second region (10b, 11ab, 11bb, 11cb) being located outside of the first region to recover heat from high temperature product gas coming from a combustion chamber, wherein the heat recovered in the second region is conducted to the first region; the combustion chamber (8) being located covering both the first region and the second region and enclosing these regions; a fuel-air mixture supply passage (7) to feed the fuel-air mixture into the central first region; and an exhaust passage (6) to lead the flue gas discharged from the second region to the exhaust opening (9), which exhaust passage is located adjacent to and outside of the fuel-air mixture supply passage and is separated by a separation wall (4) therefrom. A combustion apparatus is further provided with a porous burner component having a third region (10c, 11ac, 11bc, 11cc) through which the fuel-air mixture permeates, which third region is located at outside of the second region, and is provided with a peripheral fuel-air mixture supply passage (5) to lead the fuel-air mixture permeated through the third region into the central fuel-air mixture supply passage.

11 Claims, 10 Drawing Sheets

FIG.6(d) (PRIOR ART)
FIG.6(e) (PRIOR ART)
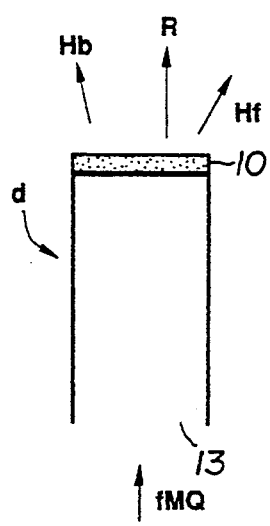
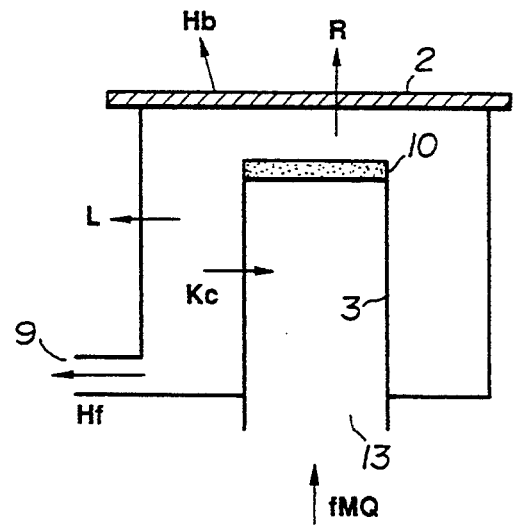
FIG.6(f)
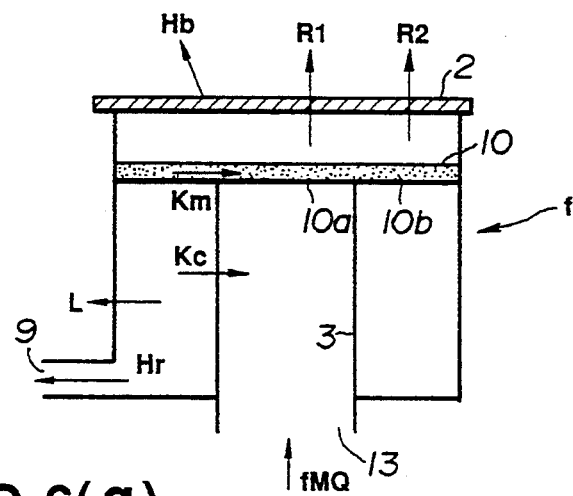
FIG.6(g)
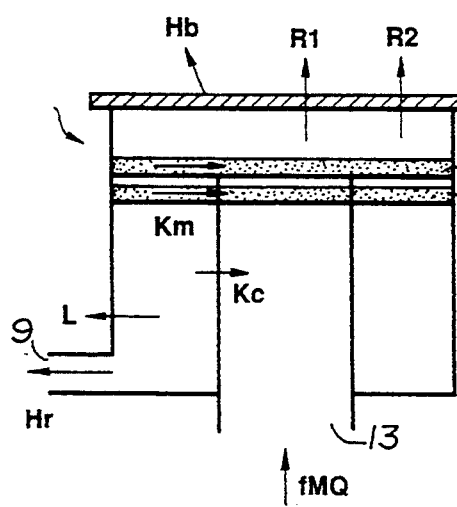
FIG.6(h)
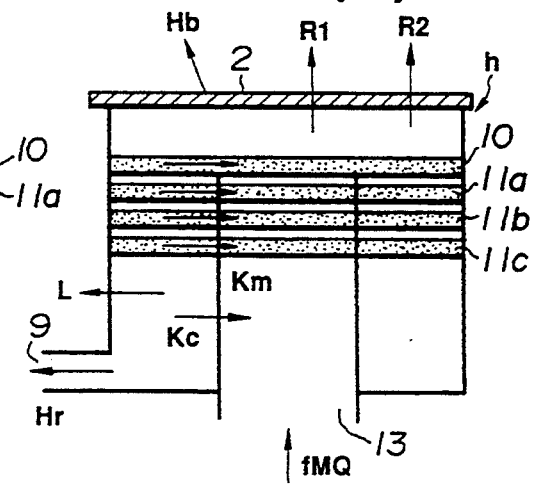

Ur=10cm/s  EQUIVALENCE RATIO φ = 0.75

R/fMQ   Hb/fMQ   Hf/fMQ   OTHER HEAT LOSS (Hb+R)/fMQ=35%

(Hb+R)/fMQ=70% ial conditions, of apparatus a and b of FIG. 2 while both apparatus were operated under similar condition.

COMBUSTION APPARATUS HAVING HEAT-RECIRCULATING FUNCTION

BACKGROUND OF THE INVENTION

1. Field of the Invention

This invention relates to a combustion apparatus having a heat-recirculating function which preheats a fuel-air mixture using the heat-recirculation from high temperature product gas, in particular to a combustion apparatus employing a surface combustion burner as the combustion zone (burner) thereof.

2. Description of the Related Art

Many types of plane exothermic surface combustion burners have been developed and commercialized as a heat source for industrial use as well as for household use because they easily generate emissive power with low pollutant emission by adopting a porous burner component in a shape of flat plate, curved plate, or block provided with many gas passage pores and by combusting the fuel-air mixture, passed through the porous burner component, at the downstream surface of the component to form a uniform plane red-heat condition stably existing thereon.

Since the combustion apparatus using a surface combustion burner has to form a combustion zone in the porous burner component near the surface thereof to make the plane red heat combustion zone a high radiation condition, the combustion apparatus with a surface combustion burner has the limitation that the fuel-air mixture cannot be ejected from the porous burner component at a higher speed than the burning velocity of the mixture thereof.

The equivalence ratio of flammable fuel-air mixture (the value of fuel-air ratio divided by theoretical fuel-air ratio) is in a range of 0.9 to 1.1, in order to gain higher emissive power. The adiabatic flame temperature within that range considerably exceeds the durable limit of, for example, a metallic sintered fiber mat used as the porous burner component. As a result, most of the supplied heat has to be emitted as the high temperature exhaust gas, and the radiation efficiency is only 25% (for equivalence ratio of 1) at the most.

Conventional heat-recirculating combustion apparatuses of heat-recirculating type have been introduced to reduce the heat supply by preheating the fuel-air mixture with the recovered waste heat of combustion gas and to substantially improve the radiation efficiency. These conventional heat-recirculating combustion apparatuses of heat-recirculating type are either of the type which provide heat exchange via a separation wall located between the fuel-air mixture supply passage and the combustion gas exhaust passage, or of the type which is provided with a specially designed heat exchanger or heat accumulator. Regarding the former type which provides heat exchange via a separation wall located between the fuel-air mixture supply passage and the combustion gas exhaust passage, insufficient heat transfer area of the separation wall results in an insufficient effect, so the size of the apparatus has to be enlarged. As for the latter type which is provided with a specially designed heat exchanger or heat accumulator, the added equipment complicates the structure of apparatus and enlarges the apparatus size, and furthermore the efficiency of heat exchanger and heat accumulator needs improvement.

SUMMARY OF THE INVENTION

The object of this invention is to provide a combustion apparatus having heat-recirculating function using a surface combustion burner, which combustion apparatus performs complete combustion with a low calorie lean mixture, forms a uniform red heat plane, obtains a high radiation efficiency, has a simple configuration, and does not require an additional heat exchanger or heat accumulator.

The combustion apparatus having a heat-recirculating function to preheat a fuel-air mixture being fed to a porous burner component using waste heat from a high temperature product gas being discharged from a combustion chamber while making the fuel-air mixture pass through and eject from the porous burner component into the combustion chamber at a speed not higher than the burning velocity of the fuel-air mixture to combust and while maintaining the combustion surface of the burner component at red heat state comprises:

a porous burner component being made of permeable metallic material and having a first region at the center part where the fuel-air mixture is ejected and the red heat state is formed on the surface of ejected side and having a second region being located outside of the first region to recover heat from high temperature product gas coming from combustion chamber, wherein the heat recovered in the second region is conducted to the first region;

the combustion chamber being located covering both the first region and the second region and enclosing these regions;

a fuel-air mixture supply passage to feed the fuel-air mixture into the central first region; and a product gas exhaust passage to lead the combustion gas discharged from the second region to the exhaust opening, said exhaust passage being located adjacent to and outside of the fuel-air mixture supply passage and being, separated by a separation wall therefrom.

A combustion apparatus is further provided with a porous burner component having a third region through which the fuel-air mixture is ejected, which third region is located at outside of the second region, and the combustion apparatus is provided with a peripheral fuel-air mixture supply passage to lead the fuel-air mixture passed through the third region into the central fuel-air mixture supply passage.

BRIEF DESCRIPTION OF THE DRAWING

FIG. 2 (b) is a schematic drawing of the combustion apparatus of this invention using a burner component having two regions.

FIG. 2 (c) is a schematic drawing of the combustion apparatus of this invention using a burner component having three regions.

FIG. 6 (d) shows a schematic drawing of the conventional combustion apparatus.

FIG. 6 (e) is a schematic drawing of the conventional combustion apparatus of heat-recirculating type.

FIG. 6 (f) is a schematic drawing of the combustion apparatus of this invention being provided with one layer of burner mat having two regions.

FIG. 6 (g) is a schematic drawing of the combustion apparatus of this invention provided with two layers of burner mat each having two regions.

FIG. 6 (h) is a schematic drawing of the combustion apparatus of this invention provided with four layers of burner mat each having two regions.

FIG. 12 (b) shows a heat balance of the apparatus f in FIG. 6.

FIG. 13 (b) illustrates a temperature profile of the combustion system of apparatus f in FIG. 6.

DETAILED DESCRIPTION

Figure 1:
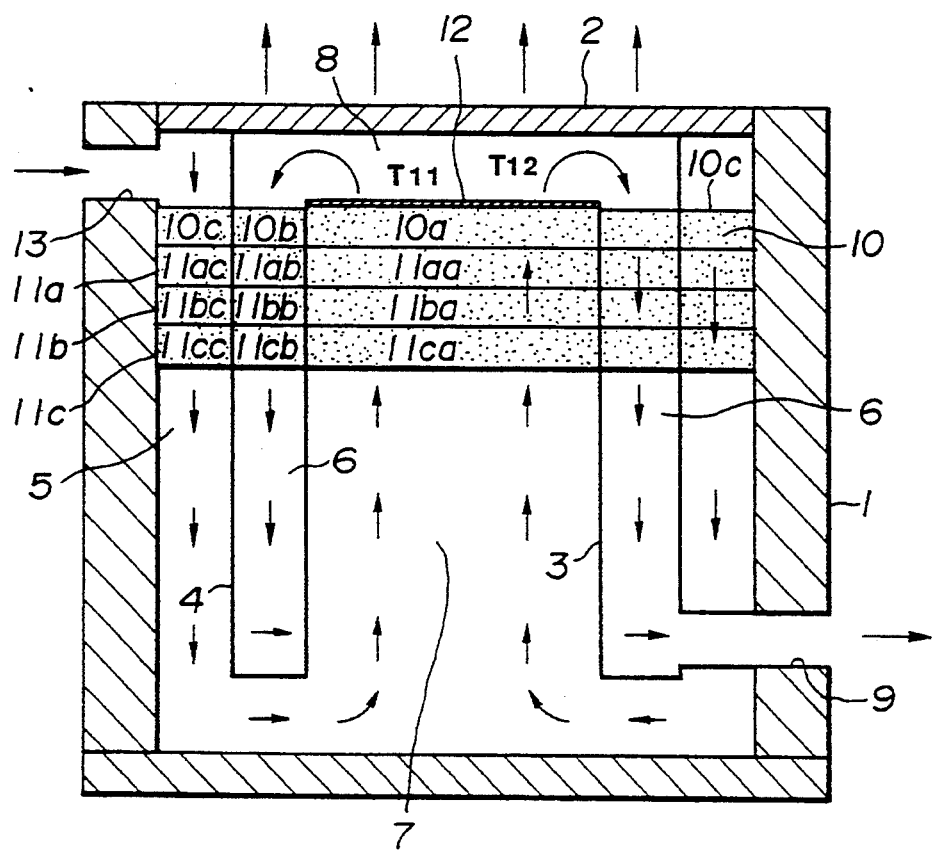
FIG. 1 is a schematic drawing of a combustion apparatus of an embodiment of this invention.

FIG. 1 shows a schematic drawing of the core part of combustion apparatus having heat-recirculating function as an embodiment of this invention. In FIG. 1, the enclosure 1 forms the housing of the apparatus. The top of the enclosure 1 is sealed by a radiant transmission window material 2 to form a closed space therebelow. The closed space has concentric metallic separation walls 3 and 4, and the space is provided with, from external to internal, peripheral annular supply passage 5, annular exhaust passage 6, and central supply passage 7.

The top end of the peripheral annular supply passage 5 is connected to the supply opening 13 located on the enclosure 1 to introduce the fuel-air mixture. The bottom end of the peripheral annular supply passage 5 is connected to the bottom end of the central supply passage 7. The mat component which is described later covers the peripheral annular supply passage 5, annular exhaust passage 6, and the upper zone (below the level of supply opening 13) of the central supply passage 7. The space surrounded by the porous mat component, metallic separation wall 4, and radiant transmission window material 2 forms the combustion chamber 8. The top end of the central supply passage 7 is led to the combustion chamber 8 via the porous mat component. The combustion chamber 8 is connected to the annular exhaust passage 6 via the porous mat component, and the bottom end of annular exhaust passage 6 is connected to the exhaust opening 9 located on the enclosure 1.

The porous mat component consists of some metallic sintered fiber mats, 10, 11a, 11b, and 11c. The metallic sintered fiber mats are, for example, made of stainless steel. The metallic separation walls 3 and 4 penetrate the metallic sintered fiber mat layers, and the permeation among the passages is substantially inhibited. Since these metallic sintered fiber mats have a structure to suppress the horizontal flow of gas, the boundary of each passage within the mat is not necessarily provided with a separation wall. The central part 10a, 11aa, 11ba, and 11ca corresponding to the central supply passage 7 of the metallic sintered fiber mats 10, 11a, 11b, and 11c form the first region. The annular part 10b, 11ab, 11bb, and 11cb corresponding to the annular exhaust passage 6 form the second region. The peripheral annular part 10c, 11ac, 11bc, and 11cc corresponding to the peripheral annular supply passage 5 form the third region. The surface facing the combustion chamber 8 of the first region 10a of the top metallic sintered fiber mat 10 becomes the combustion zone of the burner to hold the flame 12. In the vicinity of the burner combustion plane, an igniter (not shown) is located.

The top face of the combustion chamber 8 facing the combustion zone is covered with a radiant transmission material 2 such as quartz glass having a high transmissivity to infrared and heat rays, and the combustion chamber 8 forms a closed space. This configuration allows all the high temperature product gas generated by combustion to flow through the mat layer of the second region and to discharged into the exhaust passage 6.

With respect to the combustion apparatus having the structure described above, the incoming flammable gas mixture being introduced from the supply opening 13 flows across the mat layers, 10c, 11ac, 11bc, and 11cc in the third region, and further flows into the peripheral annular supply passage 5. The fuel-air mixture passed through the peripheral annular supply passage 5 flows into the central supply passage 7 and passes through the mat layers, 11ca, 11ba, 11aa, and 10a of the first region and reaches the combustion chamber 8.

Within the combustion chamber 8, the fuel-air mixture which flows out onto the surface of the mat of the first region (referred to simply as "burner mat" hereafter), 10a, is combusted to form the flame 12. The high temperature product gas makes the burner mat 10a or in some cases the total or a part of the surrounding annular part 10b in the second region red hot, which results in irradiating the radiation heat to the outside through the transmission window material 2. The area of red heat region can be maintained on the whole surface of the burner mat 10a by keeping the flow velocity of fuel-air mixture from the burner mat 10a below the burning velocity of the fuel-air mixture. Generally, the adhered red heat condition is obtained at approximately 30 cm/sec or less of the flow velocity of fuel-air mixture.

The high temperature product gas generated in the combustion chamber penetrates the mat layers of the second region passes through the exhaust passage 6, and exits from the exhaust opening 9. During the period for the high temperature product gas to pass through the mat layers 10b, 11ab, 11bb, and 11cb in the second region, the heat conductive fiber system of each mat in the second region recovers the waste heat from the product gas. The recovered waste heat is then transferred to the mat layers of the first region and the third region by the heat conduction of the heat conductive mat fiber.

Consequently, the fuel-air mixture introduced from the supply opening 13 at ambient temperature passes through the preheated mat layers 10c, 11ac, 11bc, and 11cc in the third region and the preheated mat layers 11ca, 11ba, 11aa and 10a in the first region before entering the combustion zone via the supply passages 5 and 7. As a result, the fuel-air mixture is sufficiently preheated by the waste heat of the product gas before reaching the combustion zone and the exhaust gas lowers its temperature before reaching the exhaust opening 9. The amount of heat emitted from the exhaust opening 9 with the product gas becomes very small. Particularly in the mat 10, the burner mat 10a is heated by the high temperature heat recovered from the mat 10b in the second region, which raises the temperature of the mat 10a and increases the radiation heat generated from the combustion zone and increases the gas temperature.

According to this invention, it is important to perform the heat transfer efficiently during the period of recovery of waste heat from the high temperature combusted product gas using the permeable metallic component in the second region, and during the period of heating the first region of the permeable metallic component by transferring the recovered heat from the second region to the first region using direct heat conduction of the metallic component, and during the period of preheating the fuel-air mixture passing through the first region.

In the embodiment of this invention described above, each of the metallic sintered fiber mats preferably has the sintered porous structure where the fibers are woven in the plane direction to form a stratified configuration in the thickness direction. Use of such a stratified metallic sintered fiber mats allows the product gas to penetrate across the layered porous structure, which achieves the efficient heat recovery from the product gas and the efficient heat supply to the mat with combustion zone and to the fuel-air mixture. Since the fibers oriented along the plane significantly contribute to the heat transfer, a high thermal conductivity is achieved especially in the plane direction of the mats in the first region and the second region. The directional heat conduction makes a favorable transfer of the recovered heat from the second region to the first region. This effect is very strong for the efficiency of heat-recirculation.

Figure 2A:
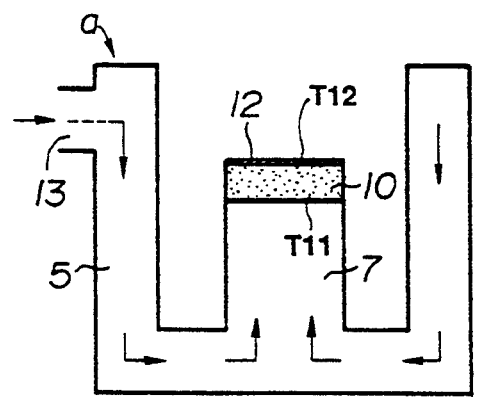
FIG. 2 (a) is a schematic drawing of structure of the conventional combustion apparatus.
Figure 2B:
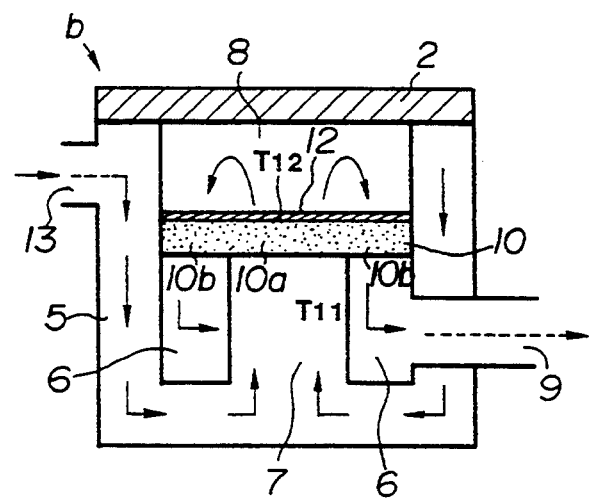
Figure 2C:
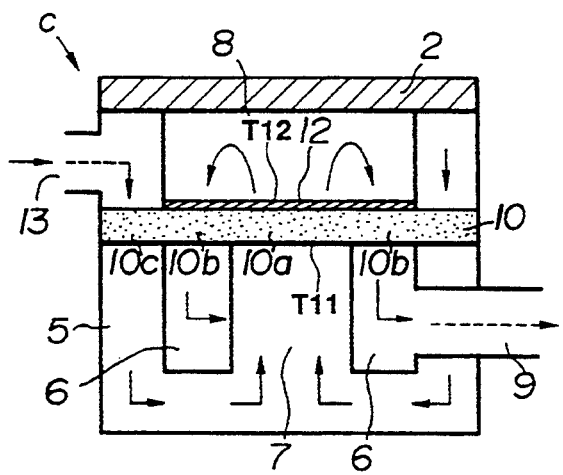

FIG. 2 shows schematic comparison drawings of the structure of a conventional combustion apparatus a, and typical combustion apparatuses of heat-recirculating type of this invention, b and c. The apparatus a is a conventional combustion apparatus without heat recirculation. The apparatus b is an embodiment of this invention, a heat-recirculating type combustion apparatus. The apparatus b transfers the waste heat received in the peripheral region 10b of the burner mat to the central region 10a of the same burner mat by heat conduction, and preheats the fuel-air mixture at the upstream of the combustion zone and, at the same time, heats the area directly beneath the combustion zone of the burner mat. The apparatus c is another embodiment of this invention illustrating a combustion apparatus with a two stage heat-recirculating type. Similar to the apparatus b, the apparatus c is provided with a large diameter burner mat 10 made of a permeable metallic component, and the apparatus receives the waste heat in the central annular region 10b from the high temperature product gas, and transfers the heat to the central region 10a and to the peripheral annular region 10c by heat conduction, and preheats the gas mixture at the upstream of combustion zone with two stages and, at the same time, heats the area directly beneath the combustion zone of the burner mat 10a.

The components having the same numbers in FIG. 2 and in FIG. 1 correspond with each other. In the conventional combustion apparatus a, the fuel-air mixture at ambient temperature which enters from the supply opening 13 reaches the burner mat 10 via the supply passages 5 and 7. The fuel-air mixture passes through the burner mat 10 and is combusted on the downstream surface of the burner mat 10. The high temperature product gas is vented to the atmosphere.

In the combustion apparatus of heat-recirculating type, the apparatus b, an embodiment of this invention, the fuel-air mixture at ambient temperature is introduced from the supply opening 13 and reaches the burner mat 10 via the supply passages 5 and 7. The fuel-air mixture penetrates the central region 10a of the burner mat 10 and is combusted on the downstream surface thereof. The combustion zone is sealed with an infrared and heat ray transmission window 2. The high temperature product gas passes through the peripheral region 10b of the burner mat 10 made of a permeable metallic component and flows out from the exhaust opening 9 via the exhaust passage 6. During the product gas passage, the peripheral region 10b of the burner mat 10 receives the waste heat from the high temperature product gas. The received heat is transferred to the central region 10a of the burner mat by heat conduction to heat the area directly beneath the combustion zone of burner mat and to preheat the fuel-air mixture upstream of the combustion zone.

Regarding the combustion apparatus c, with a two stage heat-recirculating function, a further embodiment of this invention, the gas mixture at ambient temperature is introduced from the supply opening 13 and passes through the supply passages 5 and 7 to reach the central region 10a of the burner mat 10, then penetrates the central region 10a and is combusted on the downstream surface of the burner mat 10. The combustion zone is sealed with the infrared and heat ray transmission window 2. The high temperature product gas passes through the intermediate annular region 10b of the burner mat 10 made of a permeable metallic component, then the product gas flows out from the exhaust opening 9 via the exhaust passage 6. On the product gas passage, the intermediate region 10b of the burner mat 10 receives the waste heat from the high temperature product gas. The received heat is transferred to the central region 10a of the burner mat 10 and to the peripheral annular region 10c by heat conduction to heat the area directly beneath the combustion zone of the burner mat 10 and to preheat the gas mixture coming from the supply opening, 13 with two step heating in the upstream of combustion zone.

Figure 3:
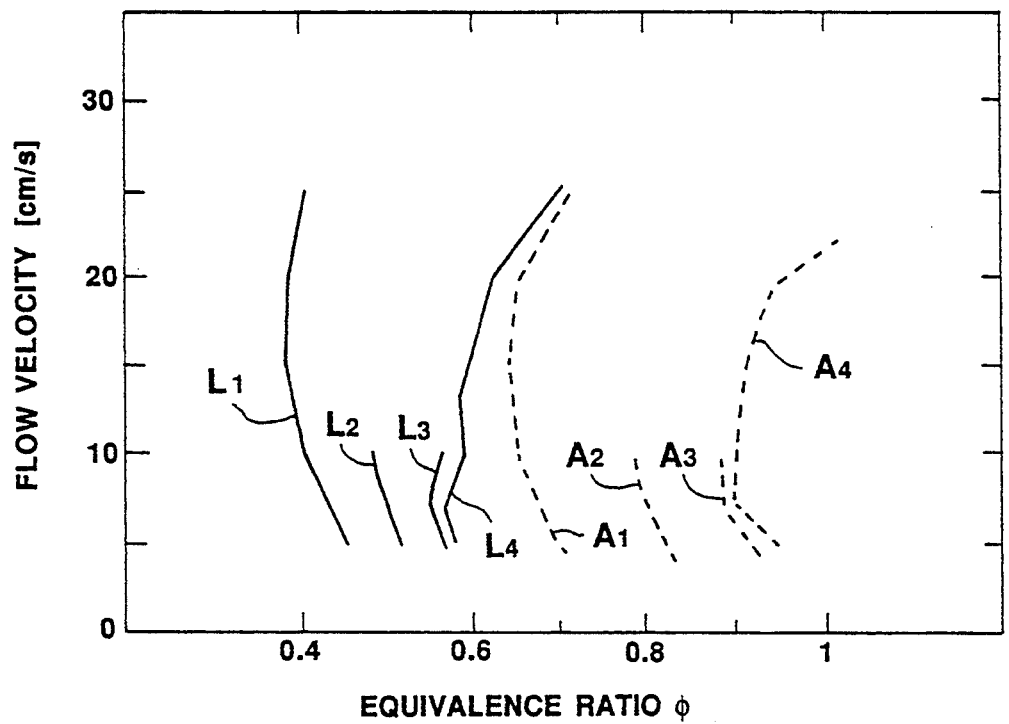
FIG. 3 is a graph which shows observed data of lean side combustible limit (blow-off limit) of the fuel-air mixture and of absolute red heat limit for each of the apparatus a and b of FIG. 2 while both apparatus were operated under similar condition.

FIG. 3 shows the data of lean combustible limit (blow-off limit) of the fuel-air mixture and of absolute red heat limit for each of the apparatus a and b of FIG. 2 while both apparatuses were operated under similar conditions. The horizontal axis represents the equivalence ratio 0, (the fuel/air ratio of the supplied fuel-air mixture divided by the theoretical fuel/air ratio: $\phi = 1.0$ corresponds to the theoretical fuel to air ratio calculated from the reaction formula; $\phi < 1$ gives leaner fuel-air mixture.) The vertical axis, Ur, represents the flow velocity of fuel-air mixture at the burner mat 10 downstream surface.

The combustion apparatus body employed in this experiment was made of stainless steel (SUS316L) having the size of 350 mm outside diameter and 500 mm height. The burner mats employed were: stainless steel (SUS316L) sintered fiber mat; ceramic porous plate; and sintered metal plate: all having the size of 340 mm outside diameter and 4 mm thick. The fuel used was lean fuel mixture with air (mixing ratio: 1–3 of excess air factor, flow rate: 0.1–1.0 $Nm^3/h$).

In FIG. 3, the characteristics $L_1$ through $L_4$ indicate the combustible limit, and $A_1$ through $A_4$ indicate the absolute red heat limit. The suffix for each characteristic has the meaning of: 1 for the combustion apparatus b with heat-recirculating function using the stainless steel sintered fiber mat; 2 for the combustion apparatus b with heat-recirculating function using the sintered metal plate; 3 for the combustion apparatus b with heat-recirculating function using the ceramic porous plate; and 4 for the conventional combustion apparatus a using the stainless steel sintered fiber mat.

As clearly shown in FIG. 3, compared with the apparatus a having no heat-recirculating function, the combustion apparatuses b having heat-recirculating function shifts the lean side combustion limit and the red heat limit more to the lean side. Among the apparatuses with heat-recirculating function, the case with a ceramic porous plate (characteristics $L_3$ and $A_3$) gives a rather poor heat recovery rate because of the low thermal conductivity of ceramic material, giving a nearly equal performance with that of conventional combustion apparatus (characteristics $L_4$ and $A_4$). Similar to the ceramic porous burner, the metallic porous burner plate (characteristics $L_2$ and $A_2$) floats the flame above the mat surface at a relatively low flow velocity of the fuel-air mixture and the flame is blown-off, so the flow velocity has to be suppressed to a low level.

Figure 4:
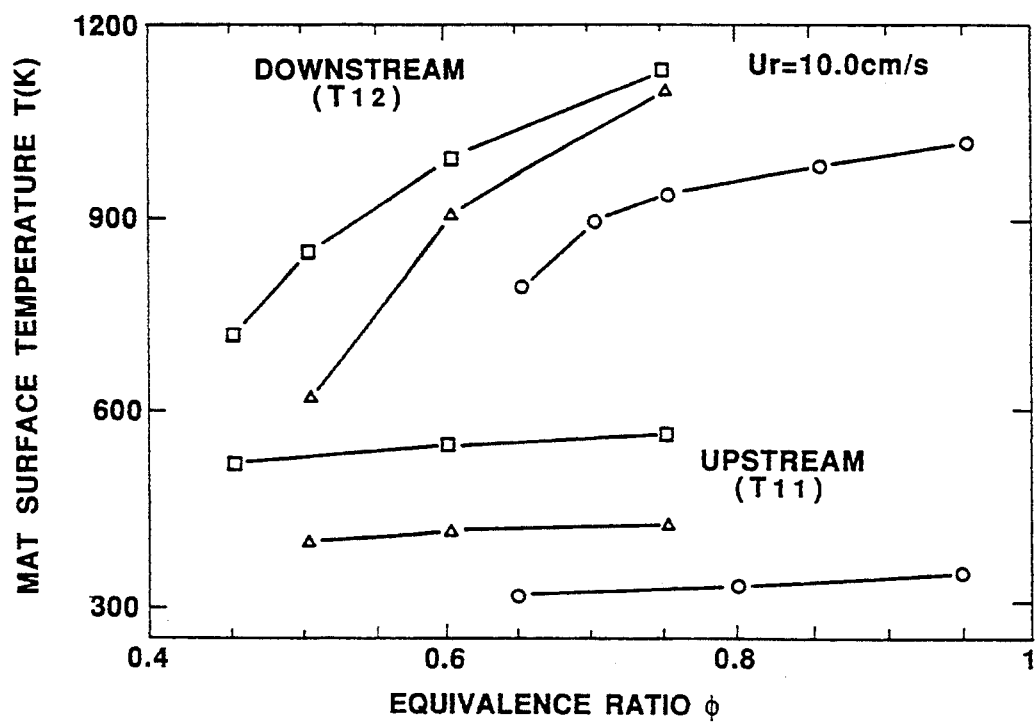
FIG. 4 is a graph which shows the data of temperature in upstream surface of the mat and downstream surface of the mat when a metallic sintered fiber mat having the same type and dimension is installed as the burner mat to the apparatuses a, b, and c of FIG. 2.

FIG. 4 shows the mat surface temperature as a function of the equivalent ratio for the three configurations, a, b, and c in FIG. 2 at the flow velocity Ur=10 cm/sec.

In FIG. 4, points of white circles (O) indicate the characteristic of conventional combustion apparatus a, points of white triangles ($\Delta$) indicate those of the combustion apparatus b with heat-recirculating function, and points of white squares ($\square$) indicates those of the combustion apparatus c with two stage heat-recirculating function. The effect of heat-recirculating increases in the order of white circles, white triangles, and white squares. Along the trend, the surface temperature at both upstream side and downstream sides increases on the lean side to increase the quantity of recovered heat. The increase of quantity of heat owing to the heat recovery allows the uniform red heat combustion on the whole surface on the lean side and contributes to the prevention of blow-off even in a lean gas region.

Figure 5:
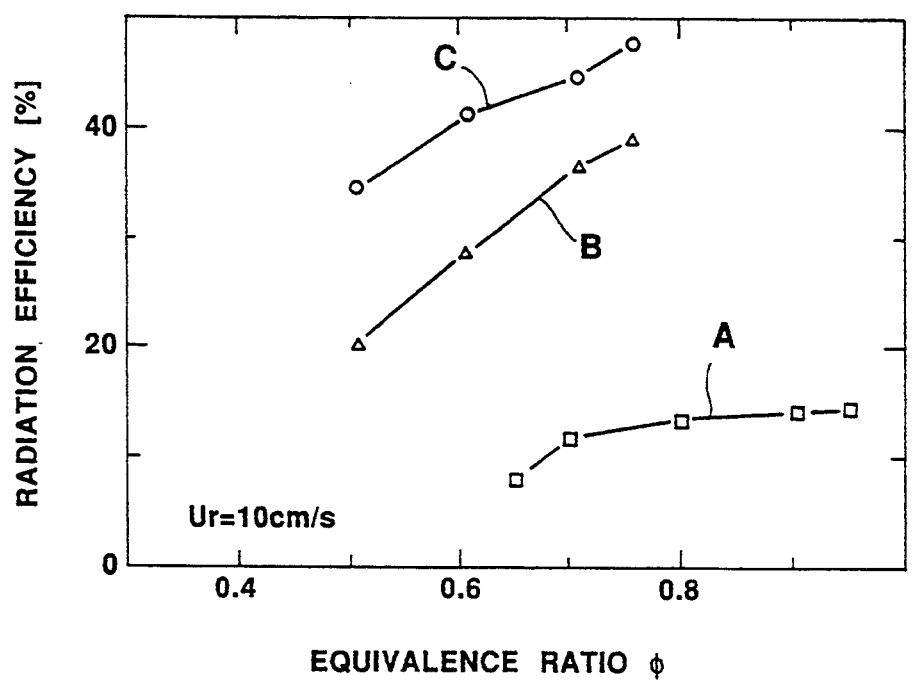
FIG. 5 is a graph which shows the rate of supplied fuel into the effective radiation heat (radiation efficiency) on each of the apparatus a, b, and c of FIG. 2.

FIG. 5 shows the thermal efficiency of supplied fuel to effective radiation (radiation=radiated heat/supplied heat) on each of the combustion apparatuses used in FIG. 4. Characteristic A corresponds to the conventional combustion apparatus a, characteristic B corresponds to the combustion apparatus b, and characteristic C corresponds to the combustion apparatus c.

According to the combustion apparatus c, the characteristic C indicates that the equivalence ratio $\phi = 0.75$ gives slightly less than 50% efficiency. The efficiency level is more than four fold of characteristic A of the conventional combustion apparatus a at the same equivalence ratio. As for the combustion apparatus c, the characteristic C indicates that the equivalence ratio $\phi = 0.5$ gives 33% efficiency. For the conventional combustion apparatus a (characteristic A), the maximum radiation efficiency is approximately 25% at the equivalence ratio $\phi = 1.1$. Consequently, with the same combustion apparatus size, the combustion apparatus c with two stage heat-recirculating function saves 55% of fuel to give 1.3 fold of efficiency by circulating the recovered heat compared with the conventional combustion apparatus a.

FIG. 6 illustrates further detailed structure of both the conventional combustion apparatus and the embodiment of this invention to compare details of the heat-recirculating mechanism. Both cases employ the metallic sintered fiber mat as the burner mat having the same material and same thickness. The components having the same symbol with FIG. 1 correspond to the ones in FIG. 1.

In FIG. 6, the apparatus d is the conventional combustion apparatus without heat-recirculation. The apparatus e is the conventional combustion apparatus which carries the heat-recirculating solely by the gas flow separation wall. The apparatus f is an embodiment of this invention the combustion apparatus having heat-recirculation function which carries the heat-recirculating by the gas flow separation wall, by preheating the fuel-air mixture in upstream of the combustion zone through conduction of heat to the central part of the large burner mat, and by heating the area directly beneath the combustion zone of mat. The apparatus g is an another embodiment of this invention, a combustion apparatus having heat-recirculating dual layer structure installing a metallic sintered fiber mat below the burner mat used in the apparatus f, in parallel. The apparatus h is a further embodiment of this invention, a combustion apparatus having heat-recirculating quadruple layer structure having three metallic sintered fiber mats installed below the burner mat used in the apparatus f, in parallel.

In FIG. 6, the comparative experiments of apparatus d, e, and f show the relation between the supplied heat, fMQ, and various types of heat including the recirculation heat, Kc, which is exchanged through the metallic separation wall, the recirculation heat, Km, which is transferred through mat by heat conduction, the heat loss, L, which is emitted from the external wall of enclosure, the heat emissive power, R1, which is emitted from the burner combustion zone, the heat emissive power, R2, which is emitted from peripheral area of the large burner, and the exhausted heat, Hf, which is released from with the exhausted gas. The comparative experiments of apparatus f, g, and h show the effect of the metallic sintered fiber mat thickness, or the number of layers of permeable metallic component of this invention. The experimental result shown in FIG. 6 is further described in more detail in FIG. 7 through FIG. 10.

Figure 7:
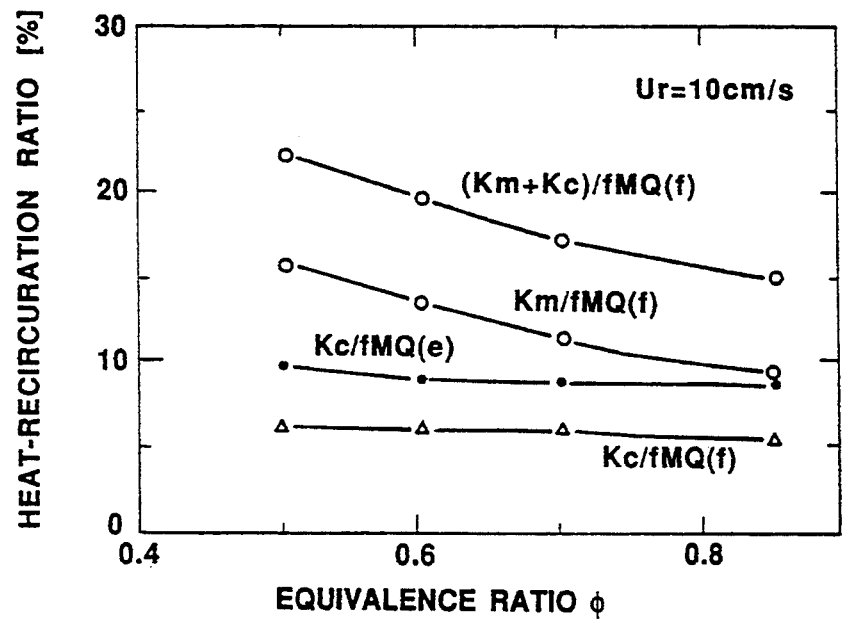
FIG. 7 is a graph which shows a comparison of recovery rate between the heat-recirculation using a separation wall in the combustion cylinder and the heat-recirculation using the sintered fiber mat, which data were obtained from the combustion experiment of the apparatus e and f in FIG. 6 and were correlated with equivalence ratio.
Figure 8:
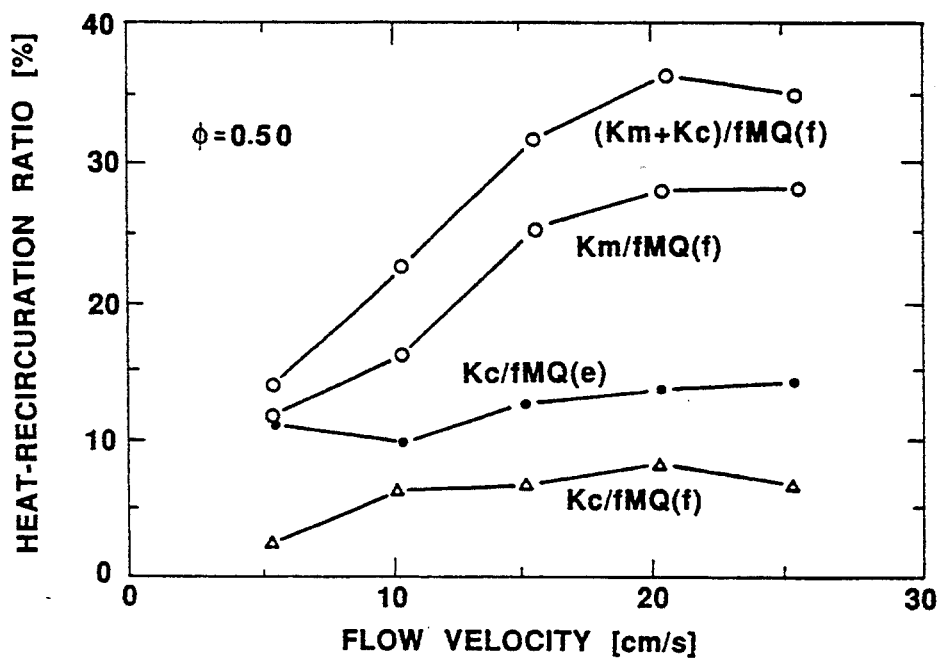
FIG. 8 is a graph which shows a comparison of recovery rate between the heat-recirculation using a separation wall and the heat-recirculation using the sintered fiber mat, which data were obtained from the combustion experiment of the apparatus e and f in FIG. 6 and were correlated with flow velocity of fuel-air mixture from the burner.

FIG. 7 shows the relation between heat-recirculating rate (%) (vertical axis) and equivalence ratio $\phi$ (horizontal axis). The heat-recirculating rate is defined by the ratio of the supplied heat, fMQ, to the recirculation heat, Kc, which is transferred through the separation wall 3 of the combustion cylinder region, or the ratio of the supplied heat, fMQ, to the recirculation heat, Km, which is transferred through the sintered fiber mat 10, which data were obtained from the combustion experiment of the apparatus e and f and were correlated with equivalence ratio. The thickness of burner mat 10 is 4 mm along the gas flow direction. The length of combustion cylinder wall 3 is 70 mm along the gas flow direction. The rate of circulation Km through the mat 10 to the supplied heat fMQ, (the heat-recirculating rate %), is larger than the heat-recirculating rate of Kc through the separation wall 3. The value of Km/fMQ increases with the decrease of equivalence ratio. On the other hand, the value of Kc/fMQ stays almost unchanged under varying equivalence ratio values. FIG. 8 correlates the ratio of supplied heat, fMQ, to the heat-recirculation, Kc, through the separation wall 3, and the ratio of supplied heat, fMQ, to the heat-recirculation, Km, through the sintered fiber mat 10, and the fuel-air mixture flow velocity, Ur, from the burner mat, which are taken from the data in FIG. 7. FIG. 8 clearly shows the difference between Kc/fMQ and Km/fMQ. The value of Km/fMQ increases with the increase of flow velocity, while the value of Kc/fMQ keeps nearly constant level independent of flow velocity.

These facts demonstrate that the metallic sintered fiber mat having a much smaller mat thickness to the combustion cylinder wall length along the gas flow direction provides a strong effect for the recirculation of recovered heat. In particular, under the operating condition of increased load, large fuel-air mixture flow rate, or low calorie fuel gas, the circulation of recovered heat using the heat conduction means such as metallic sintered fiber mat is extremely effective.

Figure 9:
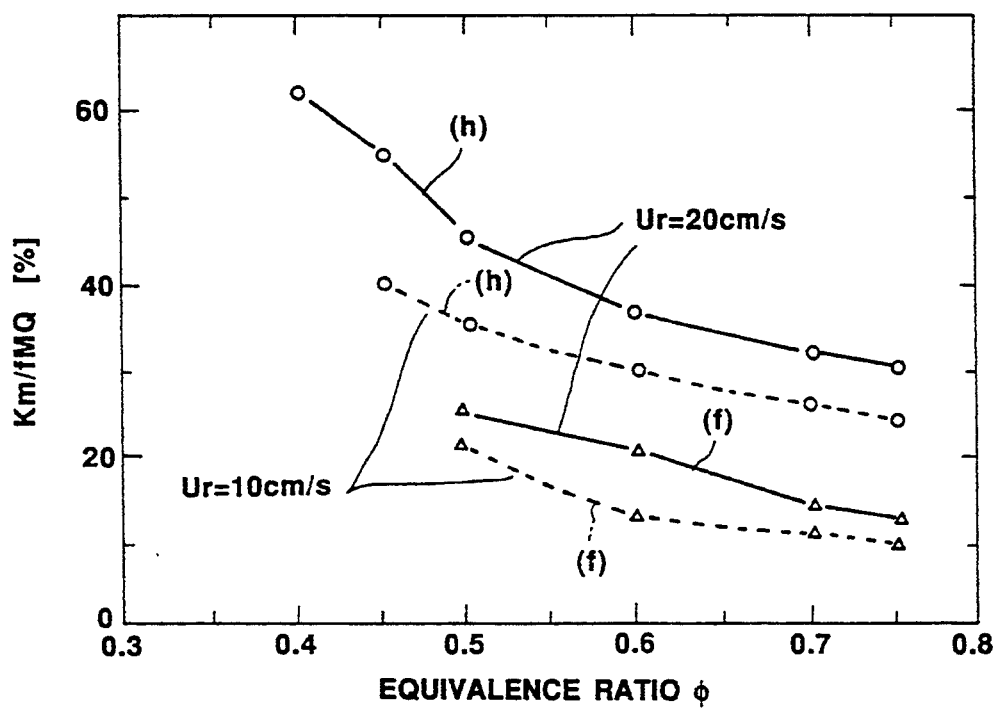
FIG. 9 is a graph which shows a correlation of the heat-recirculating rate using a sintered fiber mat and the equivalence ratio with the parameters of the number of sintered fiber mat layers and the flow velocity, which data were obtained from the combustion experiment of the apparatus f and h in FIG. 6.

FIG. 9 shows the effect of the number of metallic sintered fiber mat layers. The figure correlates the heat-recirculating rate, Km/fMQ, through the burner mat 10, with the equivalence ratio, $\phi$, using the parameters of number of sintered fiber mat layers and flow rate, Ur, which data were obtained from the combustion experiment of the apparatus f and h.

The Km increases with the increase of number of mat layers and with the decrease of equivalence ratio. Under the condition of four mat layers, 20 cm/sec of flow rate, and 0.4 (344 Kcal/Nm$^3$) of equivalence ratio, the recirculation heat through the heat conduction of mat becomes slightly above 60% of the supplied heat. In other words, the increase of number of mat layers is effective for the heat recovery under the condition of low calorie and lean combustion condition.

Figure 10:
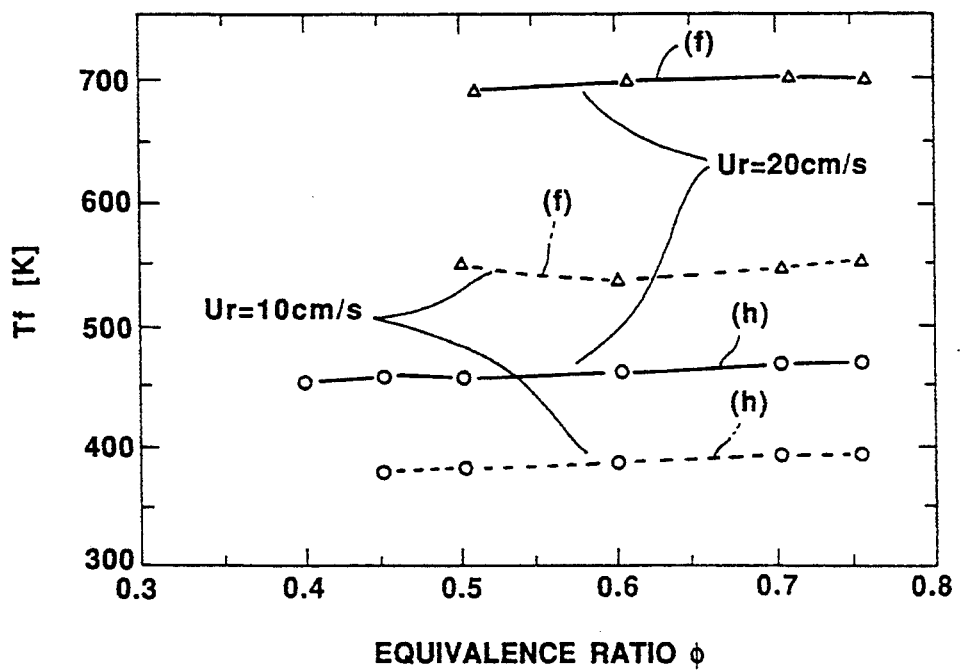
FIG. 10 is a graph shows a correlation of the equivalence ratio and the gas temperature at the exhaust opening of the combustion apparatus f and h in FIG. 6.

FIG. 10 shows a correlation of the equivalence ratio and the exhaust gas temperature, Tf, at the exhaust opening of the combustion apparatus f and h. The figure tells that increasing number of mat layers decreases the exhaust gas temperature. For example, the exhaust gas temperature of the apparatus h (four mat layers) is approximately 390K (120° C.) at 10 cm/sec of flow rate of fuel-air mixture. At the condition of 20 cm/sec of flow rate, increased number of mat layers further decreases the exhaust gas temperature.

Figure 11:
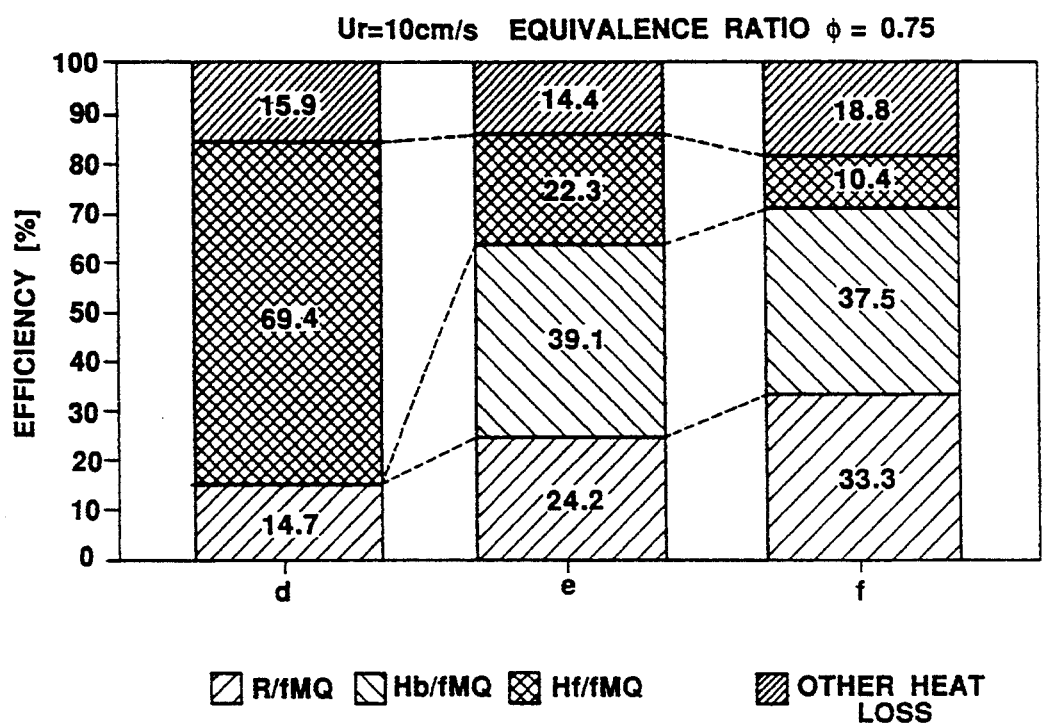
FIG. 11 is an energy audit showing the combustion radiation heat as the effective use heat, and exhaust heat brought by exhaust gas, heat loss from enclosure, and other heat loss, which data were obtained from the combustion experiment of the apparatus d, e, and f in FIG. 6.

FIG. 11 is an energy audit showing the ratio R/fMQ, which is the effective use rate of emissive power R to the supplied heat fMQ, and the ratio Hf/fMQ, which is the rate of exhaust heat taken out with the exhaust gas, and the heat loss from enclosure, and other heat loss, which data were obtained from the combustion experiment of the apparatus d, e, and f under the operating condition of Ur=10 cm/sec and $\phi$=0.75.

As seen in FIG. 11, the apparatus d gives lower emissive power than heat loss, and most of the supplied heat is exhausted to the atmosphere. In the apparatus e, the heat recirculation across the separation wall of combustion cylinder rather increases the radiation efficiency, R/fMQ, and allows the release of convection heat through the seal window 2, which decreases the exhaust heat. Nevertheless, the exhaust heat of the apparatus e remains nearly equal to the level of emissive power. The apparatus f increases the radiation efficiency more than double that of the apparatus d owing to the heat recirculation across the separation wall and further to the heat recirculation by heat conduction through the mat, and decreases the exhaust heat to approximately 10%.

Figure 12A:
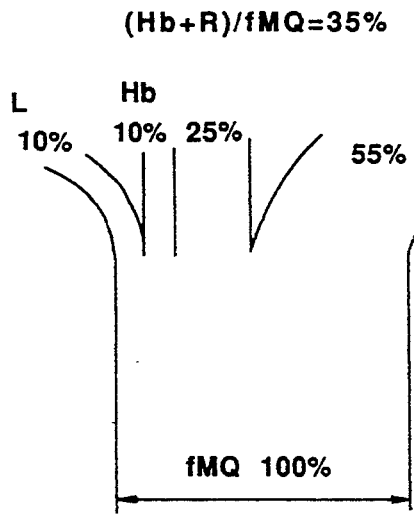
FIG. 12 (a) shows a heat balance of the apparatus d in FIG. 6.
Figure 12B:
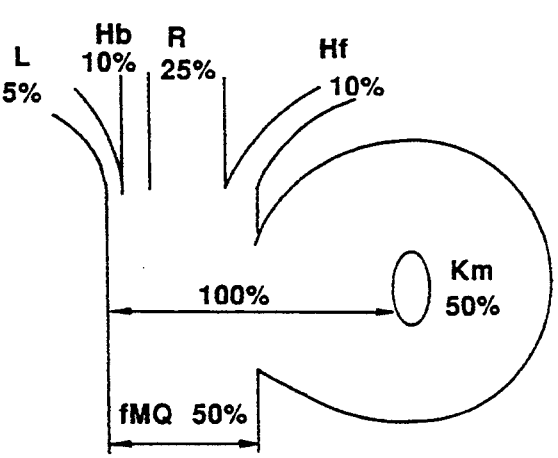

FIG. 12 shows the chart of heat balance of the apparatus d and f. FIG. 12 (a) is the heat balance of conventional apparatus d. If all the necessary heat is obtained from the supplied heat fMQ, then the radiation efficiency R/fMQ=25%, convection efficiency Hb/fMQ=10%, exhaust heat loss Hf=55%, and heat loss from the wall L/fMQ=10%. FIG. 12 (b) is a comparative heat balance of the apparatus f, an embodiment of this invention. Since the heat-recirculation provides approximately 50% of the required heat, the necessary supplied heat is as low as approximately half that of the apparatus d under the same output.

Figure 13A:
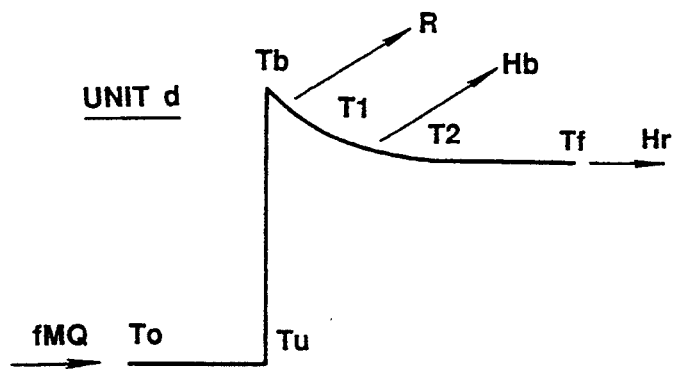
FIG. 13 (a) illustrates a temperature profile of the combustion system of apparatus d in FIG. 6.
Figure 13B:
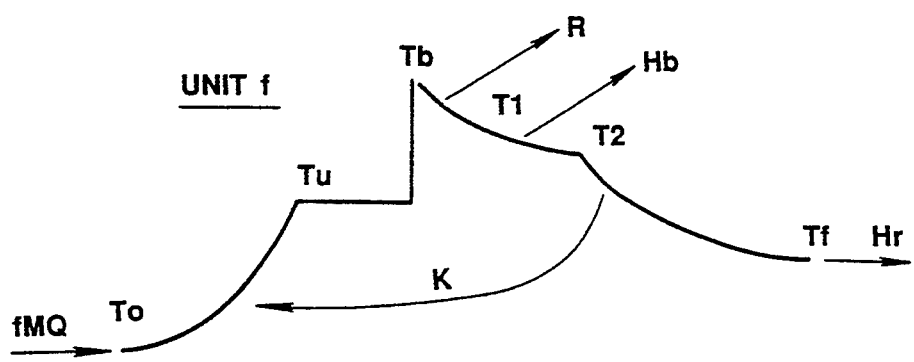

FIG. 13 (a) illustrates a temperature profile in the combustion system of apparatus d. FIG. 13 (b) illustrates a temperature profile in the combustion system of apparatus f. Under the conditions of operation of the conventional fiber mat burner, apparatus f, the initial ambient temperature, To, is equal to the temperature of the unburnt premixed reactants ahead of the flame front, Tu. After combustion raises the temperature of the products to Tb, the temperature decreases to T1, due to the loss of the radiation energy, R, and thereafter decreases to T1 due to the abstraction of any energy lost by convection, Hb. T2 is equal to the final temperature, Tf. When some of product heat, apparatus f, conveniently represented by K, is recovered and fed back to preheat the reactants, the temperature profiles changed shown in FIG. 13(b). The temperature Tu increases and the temperature Tf decreases due to recycling the heat. Under a constant flow rate and equivalence ratio, Tb is higher than any temperature attainable in a conventional burner. For a constant the temperature Tb, the temperature rise (Tb−Tu) due to combustion may be lower than that of a conventional burner. Thus, by borrowing additional enthalpy from the products, combustion with a much higher proportion of radiation is possible for a lower initial heat flow, as shown in FIG. 13(b).

Figure 14:
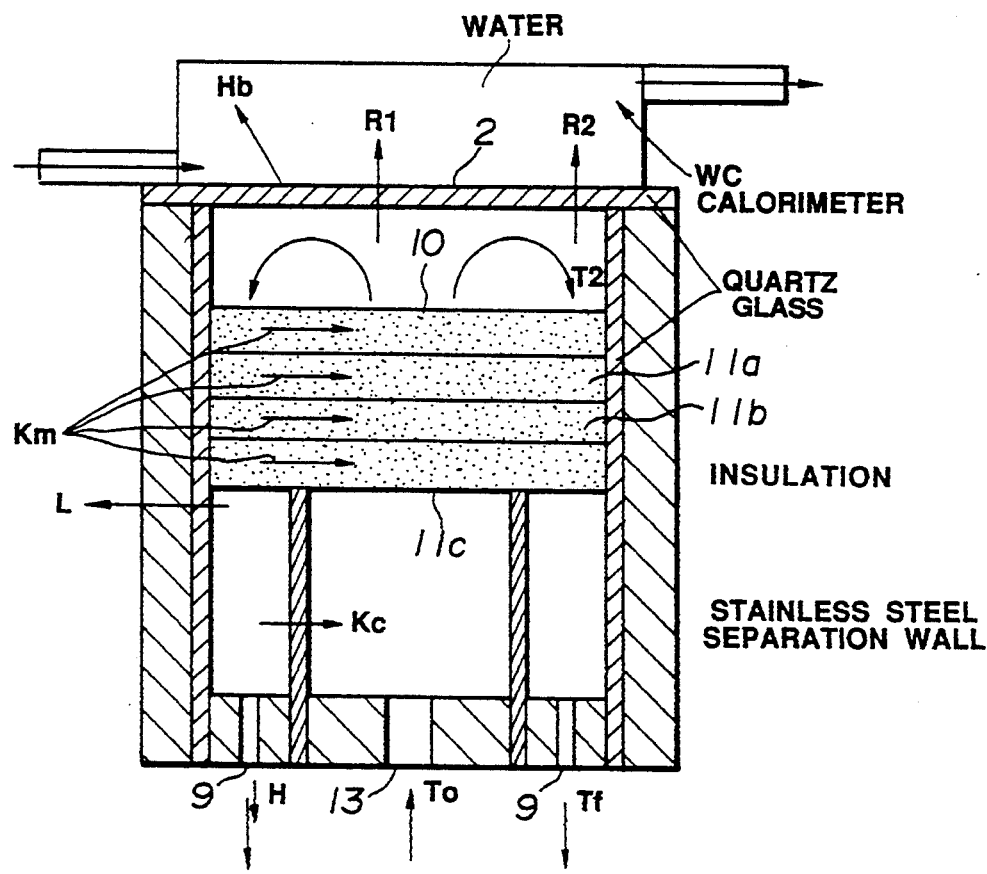
FIG. 14 shows a axial-section of burner with a saucepan-calorimeter to measure the heat of effective use in the combustion apparatus of heat-recirculating type of this invention.
Figure 15:
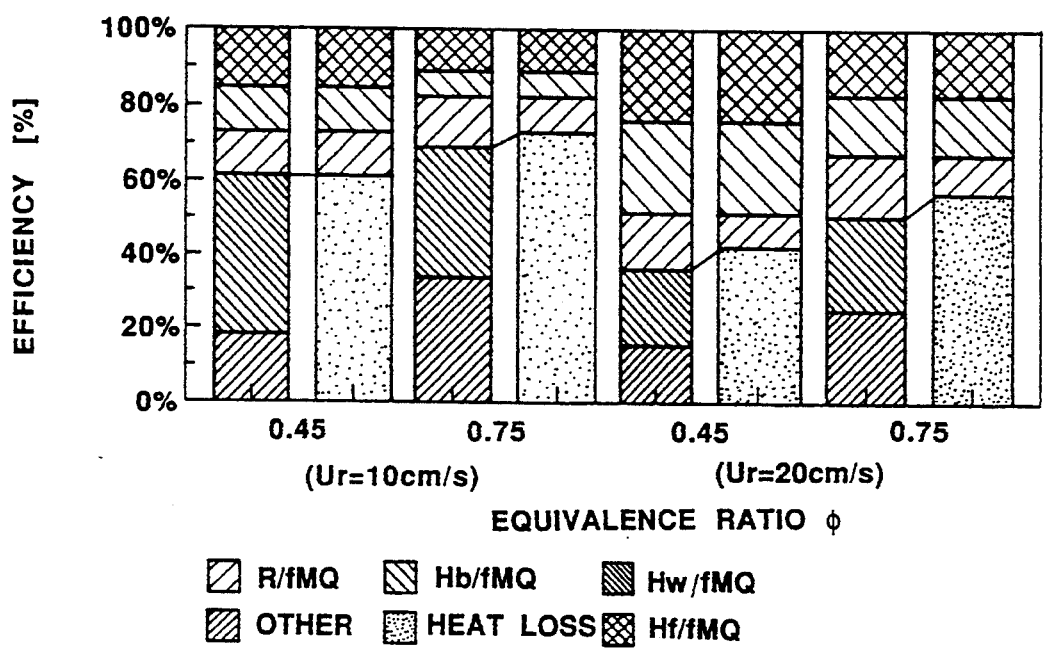
FIG. 15 shows a comparison between measured values and calculated values for typical cases of the experiments carried by the apparatus of FIG. 14.

A direct measurement of the useful heat transferred was considered necessary because the results of the previous experiments are estimated from the data of several temperatures. Therefore, water in a saucepan calorimeter was heated using the heat recirculating burner shown in FIG. 14. The efficiency of the water heating enthalpy, Hw/fMQ, which was calculated from the water temperature and the water volume, as functions of the equivalence ratio and the reference velocity is shown in FIG. 15 It is compared with the radiation efficiency, R/fMQ and the convection efficiency, Hb/fMQ, which is calculated from the mat surface temperatures and the gas temperatures.

Comparing Hw/fMQ with R/fMQ and Hb/fMQ under each condition, Hw/fMQ is equal or more than the sum of R/fMQ, confirming the correctness of the calculation of heat flow from the gas temperatures and the mat surface temperatures.

If the equivalence ratio, $\phi$, or the flow velocity Ur change, Hw/fMQ increases as the equivalence ratio increases and as the flow velocity decreases. For instance, Hw/fMQ is 72.6% when f=0.75 and Ur=10 cm/s. Possible causes for such losses may be some leakage of reactants from the plane of the mat and heat losses from the body of the apparatus. In order to increase the effective efficiency, it is important to decrease such losses. Consequently, the experiment to actually heat water also confirmed the effectiveness of the combustion apparatus of this invention. While the invention has been described in detail and with reference to specific embodiments thereof, it will be apparent to one skilled in the art that various changes and modifications can be made therein without departing from the spirit and scope of the claim. For instance, the shape of burner mat and permeable metallic component plane is arbitrarily selected such as to circular, rectangular, or polygon, and the plane is not necessarily flat and curved face or folded face may be adopted. The seal window may not be installed when the object to be heated is substantially located within a closed space.

As detailed above, the heat-recirculating combustion apparatus of this invention shifts the absolute red heat limit and the lean burning limit to more lean side than the conventional combustion apparatus using a surface combustion burner. For example, the combustion apparatus of this invention increases the radiation efficiency by approximately 30% with approximately 50% less fuel than the conventional combustion apparatus. Accordingly, the combustion apparatus of this invention achieves a stable combustion with a leaner fuel gas (gas of lower calorific value) along with significant increase of radiation efficiency to reduce the heat loss than conventional combustion apparatus.

Furthermore, the combustion apparatus with heat-recirculating function of this invention employs the heat conductive permeable metallic component made of, for example, metallic sintered fiber mat to recover heat from the high temperature product gas, and to preheat the fuel-air mixture through the circulation of recovered heat using the heat conduction in the permeable metallic component. As a result, the combustion apparatus of this invention provides approximately a two fold improvement in heat recovery efficiency even when the combustion apparatus of this invention has only one fifteenth of the dimension along the gas flow direction compared with the case that heat circulation is provided by the heat transfer across the separation wall of the combustion cylinder. The combustion apparatus of this invention can recycle sufficient heat from product gas at an extremely high efficiency, and a compact heat recovery structure is designed into the combustion apparatus. The combustion apparatus of this invention needs no special heat exchanger nor heat accumulator, and employs only a burner having relatively simple structure to form a heat-recirculating combustion apparatus.

We claim:

1. In a combustion apparatus having a heat-recirculating function to preheat a fuel-air mixture being fed to a burner component, by waste heat of a high temperature product gas being discharged from a combustion zone, while passing the fuel-air mixture into the combustion zone at a velocity not higher than the burning velocity of the fuel-air mixture for combustion and maintaining a combustion surface of the burner component at a red heat state, the improvement of the combustion apparatus comprising:

a combustion chamber;

a housing, at least an upper portion of the housing surrounding the combustion chamber;

said housing having an upper side wall portion surrounding the combustion chamber, a bottom wall arranged at the bottom of the combustion chamber and being made of a porous burner component, and a top wall arranged at the top of the combustion chamber and being transmissible to an infrared ray;

the porous burner component of the bottom wall being made of a gas permeable metallic layer and being heat conductive;

a first separation wall passing through the porous burner component and forming a passageway passing through a central portion of the porous burner component, a top end of the first separation wall communicating with an upper surface of the porous burner component and a bottom end of the first separation wall extending below a bottom surface of the porous burner component and forming a central fuel-air mixture supply passageway;

a second separation wall surrounding an outside of the first separation wall and extending through said porous burner component to form an annular exhaust passageway between said first and second separation walls, said first and second separation walls extending a predetermined distance below said bottom surface of said porous burner component, and said first and second separation walls being connected together at lower ends thereof to form lower connected portions;

an upper portion of the second separation wall being sealingly connected to the top wall of the housing and forming a side wall of the combustion chamber;

an annular peripheral fuel-air mixture supply passageway being formed between the housing and the second separation wall, the annular peripheral fuel-air mixture supply passageway communicating with the central fuel-air mixture supply passageway to enable the fuel-air mixture to flow down from the annular peripheral fuel-air mixture supply passageway, around the lower connected portions of the second and first separation walls and flow up to the central supply passageway;

a first region of the porous burner component being disposed above the central fuel-air mixture supply passageway;

a second region of the porous burner component being disposed above the annular exhaust passageway;

a supply opening for introducing the fuel-air mixture into the annular peripheral fuel-air mixture supply passageway, the supply opening being disposed at an upper portion of the housing above the porous burner component; and an exhaust conduit communicating with the annular exhaust passageway to withdraw the product gas from the annular exhaust passageway.

2. The apparatus of claim 1, wherein the porous burner component is formed by a substantially continuous metallic sintered layer.

3. The apparatus to claim 1, wherein the burner component comprises two or more layers.

4. The apparatus of claim 1, wherein the first separation wall and the second separation wall are both formed by heat conductive metal cylinders.

5. The apparatus of claim 4, wherein the top wall of the combustion chamber comprises quartz glass.

6. In a combustion apparatus having a heat-recirculating function to preheat a fuel-air mixture being fed to a burner component, by waste heat of a high temperature product gas being discharged from a combustion zone, while passing the fuel-air mixture into the combustion zone at a velocity not higher than the burning velocity of the fuel-air mixture for combustion and maintaining a combustion surface of the burner component at a red heat state, the improvement of the combustion apparatus comprising:

a combustion chamber;

a housing, at least an upper portion of the housing surrounding the combustion chamber;

said housing having an upper side wall portion surrounding the combustion chamber, a bottom wall arranged at the bottom of the combustion chamber and being made of a porous burner component, and a top wall arranged at the top of the combustion chamber and being transmissible to an infrared ray;

the porous burner component of the bottom wall being made of a gas permeable metallic layer and being heat conductive;

a first separation wall passing through the porous burner component and forming a passageway passing through a central portion of the porous burner component, a top end of the first separation wall communicating with an upper surface of the porous burner component and a bottom end of the first separation wall extending below a bottom surface of the porous burner component and forming a central fuel-air mixture supply passageway;

a second separation wall surrounding an outside of the first separation wall and extending through said porous burner component to form an annular exhaust passageway between said first and second separation walls, said first and second separation walls extending a predetermined distance below said bottom surface of said porous burner component, and said first and second separation walls being connected together at lower ends thereof to form lower connected portions;

an upper portion of the second separation wall being sealingly connected to the top wall of the housing and forming a side wall of the combustion chamber;

an annular peripheral fuel-air mixture supply passageway being formed between the housing and the second separation wall, the annular peripheral fuel-air mixture supply passageway communicating with the central fuel-air mixture supply passageway to enable the fuel-air mixture to flow down from the annular peripheral fuel-air mixture supply passageway, around the lower connected portions of the second and first separation walls and flow up to the central supply passageway;

a first region of the porous burner component being disposed above the central fuel-air mixture supply passageway;

a second region of the porous burner component being disposed above the annular exhaust passageway;

a third region of the porous burner component being disposed above the annular peripheral fuel-air mixture supply passageway;

a supply opening for introducing the fuel-air mixture into the annular peripheral fuel-air mixture supply passageway, the supply opening being disposed at an upper portion of the housing above the porous burner component and being disposed over the third region of the porous burner component; and an exhaust conduit communicating with the annular exhaust passageway to withdraw the product gas from the annular exhaust passageway.

7. The apparatus of claim 6, wherein the porous burner component is formed by a substantially continuous metallic sintered layer.

8. The apparatus of claim 6, wherein the porous burner comprises two or more layers.

9. The apparatus of claim 6, wherein the first separation wall and the second separation wall are both formed by heat conductive metal cylinders.

10. The apparatus of claim 9, wherein the top wall of the combustion chamber comprises quartz glass.

11. The apparatus of claim 7, wherein the first separation wall and the second separation wall are both formed from heat conductive metal cylinders; the porous burner comprises two or more layers; and the top wall of the combustion chamber comprises quartz glass.

* * * * *